Aug. 31, 1926.
P. REITER
1,597,824
HEATABLE SOLDERING COPPER WITH AUTOMATIC SOLDER SUPPLY BY
MEANS OF PISTON PRESSURE
Filed June 8, 1925
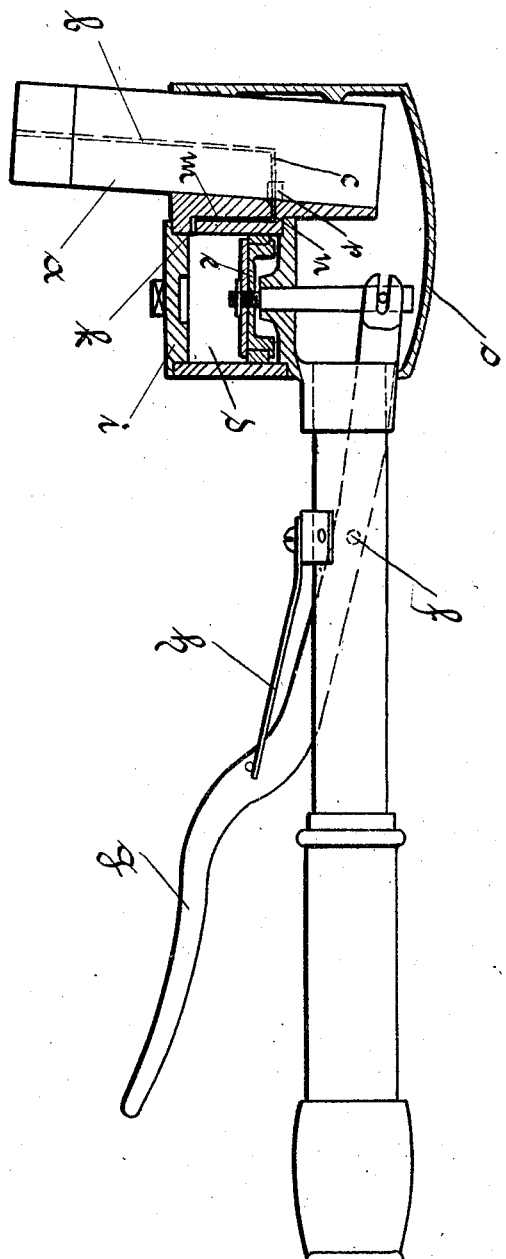

Patented Aug. 31, 1926.

1,597,824

UNITED STATES PATENT OFFICE.

PETER REITER, OF DACHAU, NEAR MUNICH, GERMANY.

HEATABLE SOLDERING COPPER WITH AUTOMATIC SOLDER SUPPLY BY MEANS OF PISTON PRESSURE.

Application filed June 8, 1925, Serial No. 35,809, and in Germany September 8, 1924.

This invention relates to a heated soldering copper with automatic supply of solder by means of piston pressure, and it has for its object to avoid premature flowing out of the solder after the heating, and without the use of special adjustable auxiliary means. According to the invention this is obtained by arranging the point, at which the solder flows out of the solder vessel, or its flowing over into the outflow channels in the soldering copper, on a higher level than the normal level of the solder in the vessel so that the solder can get into the outflow channels in the soldering copper only when it has been forced up to the point of flowing over.

An embodiment of the invention is shown, by way of example, in the only figure of the accompanying drawing in side elevation, partly in section.

The soldering copper $a$ has a central axial bore $b$ and at the upper end of said bore a transverse bore $c$. These bores serve to lead the solder to the soldering point. The heatable solder vessel $d$ consists of a vertical hollow cylinder in which a pressure piston $e$ is arranged which can be moved down and up by means of a two-armed lever $g$ fulcrumed at $f$. A spring $h$ holds the piston $e$ permanently in its highest position. The cylinder $d$ is closed at the bottom end by a lid $i$ screwed in. The solder flows from the vessel $d$ into a passage $k$ at the bottom end of the vessel and is forced up into a vertical channel $m$ when the piston $e$ is pressed down by the action of the lever $g$. The solder flows then through a horizontal branch channel $u$, at the upper end of the vertical channel $m$, into the bores $c$, $b$ of the soldering copper $a$. The soldering copper $a$ is securely held on and pressed against the front wall of the vessel $d$ by a cap $o$ and by a nipple $p$ which is bored and tightly packed.

I claim:

A heatable soldering copper with automatic solder supply by means of piston pressure, comprising in combination a soldering copper having a central axial bore and a horizontal branch bore at the upper end of the central bore, a solder vessel having in its front wall at the bottom end a horizontal outflow channel a vertical continuation of said outflow channel and a horizontal branch channel at the upper end of said vertical channel communicating with said bore of the soldering copper at a point situated above the normal level of the solder in said vessel, a pressure piston in said solder vessel, a lever for operating said piston, a spring for permanently holding said lever in the highest position, a cap for tightly clamping said soldering copper against the front wall of said solder vessel, and a bored nipple for connecting said horizontal bore of the soldering copper securely and tightly with said outflow channel of the solder vessel.

In testimony whereof I affix my signature.

PETER REITER.